United States Patent [19]

Eidelberg et al.

[11] 4,030,742

[45] * June 21, 1977

[54] FITTING FOR CONDUIT AND ELECTRICAL CABLE

[75] Inventors: Jonah Eidelberg, Huntington Station; Thomas Mooney, Mount Sinai, both of N.Y.

[73] Assignee: I-T-E Imperial Corporation, Spring House, Pa.

[ * ] Notice: The portion of the term of this patent subsequent to Oct. 21, 1992, has been disclaimed.

[22] Filed: Oct. 10, 1975

[21] Appl. No.: 621,368

Related U.S. Application Data

[63] Continuation of Ser. No. 366,657, June 4, 1973, Pat. No. 3,913,956, which is a continuation of Ser. No. 194,969, Nov. 2, 1971, abandoned, which is a continuation-in-part of Ser. No. 89,303, Nov. 11, 1970, abandoned.

[52] U.S. Cl. ............................. 285/343; 174/65 SS; 285/382.7
[51] Int. Cl.[2] ..................................... H02G 3/00
[58] Field of Search ....... 285/343, 249, 248, 382.7, 285/341, 348, 342; 174/65 SS, 77 R; 339/103 R, 103 B, 103 M, 94 R

[56] References Cited

UNITED STATES PATENTS

| | | | |
|---|---|---|---|
| 2,355,166 | 8/1944 | Johanson | 339/103 R X |
| 2,522,785 | 9/1950 | Hanson | 285/382.7 X |
| 2,640,716 | 6/1953 | Bigelow | 285/382.7 X |
| 2,941,025 | 6/1960 | Wayman | 285/348 X |
| 3,040,120 | 6/1962 | Berry | 285/341 X |
| 3,109,052 | 10/1963 | Dumire et al. | 285/341 X |
| 3,476,412 | 11/1969 | Demler | 285/343 X |
| 3,501,177 | 3/1970 | Jacobs | 285/341 X |
| 3,913,956 | 10/1975 | Eidelberg et al. | 285/343 |

*Primary Examiner*—Thomas F. Callaghan
*Attorney, Agent, or Firm*—Howard C. Miskin

[57] ABSTRACT

A liquid-tight fitting is provided to connect generally non-compressible plastic conduit and electrical cable to a connection of some type. The fitting has a self-adjusting rigid plastic gland, which has a body portion with a relatively thin sleeve extending axially away from the body portion for encircling the conduit or cable. A nut threaded on the body of the fitting compresses the sleeve into sealing engagement with the conduit and fitting and to positively interconnect the conduit and connection to provide strain relief therewith.

6 Claims, 5 Drawing Figures

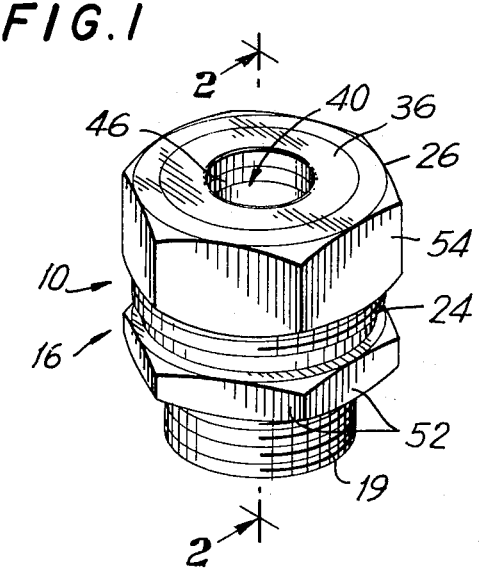
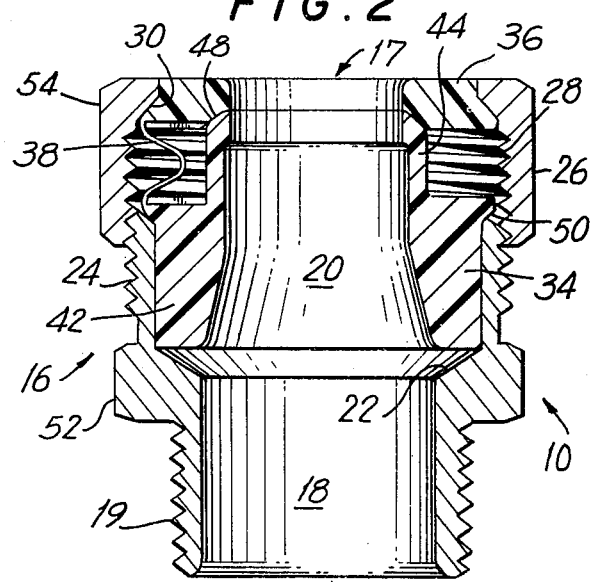
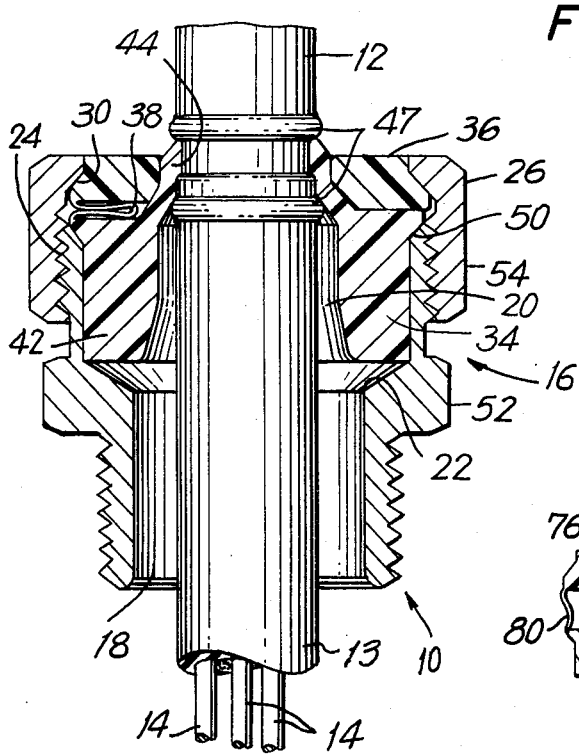
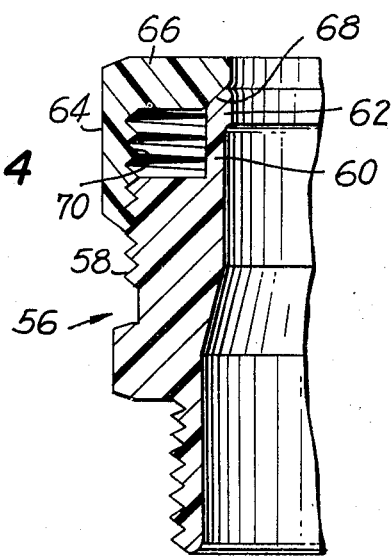
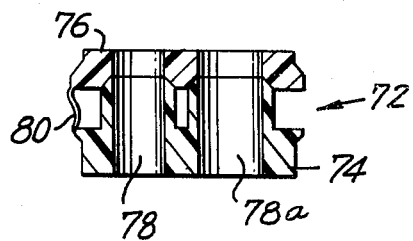

FITTING FOR CONDUIT AND ELECTRICAL CABLE

This application is a continuation of application Ser. No. 366,657 filed June 4, 1973, now U.S. Pat. No. 3,913,956, which is a continuation of application Ser. No. 194,969 filed Nov. 2, 1971, now abandoned, which is a continuation-in-part of application Ser. No. 89,303 filed Nov. 11, 1970, now abandoned.

The present invention relates to an improved fitting providing a liquid-tight, strain-relieved connection to a conduit and electrical cable and more particularly relates to an improved fitting for connection to a relatively non-deforming conduit or cable having a resilient outer coating, which provides a self-adjusting positive seal with the coating, and which can be disassembled and reassemnbled with no loss of seal or strain relief.

Cables and cords are used to protect electric current-carrying wires or conductors. The wires are covered by one or more layers of insulating material, such as rubber or a plastic resin, which are in turn covered by a plastic or rubber composition to form a flexible sheath. Aditionally the individual wires may be individually covered by the insulation or covered together to form a unitary cable. The electrical wires or conductors carried by the cable are ordinarily electrically coupled to a remote electric source.

Liquid-tight flexible cable is used in many places in which the cable is subject to: bending and heavy and rough usage, and oil, chemical or water spray. For example, an electrical cable may interconnect a portable electric tool and an outlet box in a manufacturing plant or other source of electrical power. While the tool is being used, the cable is bent and pulled. Simultaneously, the cable could be subjected to splashing from a cooling spray..

With flexible electrical cable, cord or conduit, a connection or mounting to a terminating member, such as an outlet box or the like must be made which is threadless. Heretofore, a threadless connection is accomplished by a coupler or connector consisting of a nut, a resilient gland, also known as a clamping band, and a connector. In operation the cable is inserted into the connector with the gland wedged between the encircled cable and the engaging surfaces of nut and connector. Upon drawing up tge nut on the connector, the gland is squeezed and clamped tightly about the cable until the latter is firmly held to the connector.

A properly designed threadless connector provides a fast, but easily detachable connection with the cable. The other end of the connector is outfitted for a threaded connection or when used as a coupling for another threadless connection, as the circumstances dictate. A coupler may be used as means of connecting two conduits which could be of different sizes.

The gland structure heretofore used with a cable is a soft, elastic, easily compressible rubber-like material, one form being a synthetic rubber marketed under the trademark NEOPRENE. The NEOPRENE gland provides a good seal initially, but slowly, unless the gland is supported on all sides, the material flows and weakens the seal. Additionally, with this type of structure, any force or pull applied to the cable is transmitted through the electrical wires or conductors carried by the cable to the electrical connections in the outlet box, oftentimes breaking the normally fragile connections. This oftentimes happens while working with a portable electric tool.

Fittings are relatively fixed by standards of the trade. Therefore, cables, cords and conduits used with each fitting are also restricted as well as limited in shape and size. Hence, if a cable or conduit is used that is much smaller than the opening in its fitting, some means must be used to fill the extra space. This created a source of weakness if the cable or conduit were pulled. This problem was compounded if the cable or conduit were elongated in cross-section, rather than circular.

Similarly, relatively rigid conduit having a resilient outer surface, such as thick wall nylon, or polypropylene tubing, are connected to couplings or connectors when used to transmit fluid. In many such uses, as when fluids are used to control operations of equipment, it is critical that the conduit make a fluid-tight connection as well as being positively clamped. Any leakage would seriously impair the device's reliability.

Therefore it is a principal object to this invention to provide a structurally and electrically reliable liquid-tight fitting for terminating a liquid-tight flexible electrical cable.

A further object of the present invention is to provide an improved liquid-tight fitting for flexible electrical cable, wherein the fitting is designed to provide a high degree of strain relief to the electrical connections made by the electrical conductors carried by the cable and which can be disassembled and assembled with no loss of seal.

Another object of the present invention is to provide an improved gland and gland ring for use in an electrical fitting making a threadless connection with cable and which readily adapts to any irregularities in the surface of the fitting.

A still further object is to provide an improved threadless connector providing strain relief and a liquid-tight seal to a conduit and to a fixture, and which quickly locks the conduit against being rotated or pulled out of the connector.

Still another object of the present invention is to provide an improved fitting for conduit having a gland which provides a high degree of strain relief and a fluid-tight seal with the conduit, and yet, is inexpensive to fabricate, easy to use, positive in application, and durable in use.

Still another object of the present invention is to provide a fitting for use with a wide variety of cable and conduit sizes and shapes with only changes in the gland and gland ring.

Further objects and advantages will become apparent from the description of the invention taken in conjunction with the figures, in which:

FIg. 1 is a top perspective of a connector in assembled condition, in accordance witth the present invention;

FIG. 2 is an enlarged cross-sectional view taken along line 2—2 of FIG. 1;

FIG. 3 is a view similar to FIG. 2, illustrating a flexible cable attached to the assembled connector in accordance with the principles of this invention;

FIG. 4 is a fragmentary view, partly in section, showing a further embodiment; and FIG. 5 is an elevational cross-sectional view of a still further embodiment of a gland and gland ring.

While the present invention is illustrated in the form of an electrical connector, it could also be utilized in a coupler and other type of fitting.

Reference is made to the drawing, which illustrates a connector 10 made in accordance with the present invention. Connector 10 is designed to provide a liquid-tight termination connection to a flexible cable 12 carrying electrical conductors 14, shown as three. As illustrated, cable 12 shows conductors 14 separately covered by insulation, which in turn are covered by an outer sheath of a waterproof, insulating material. Also, the cable could have insulating material integrally molded about the conductors. Heretofore, any pulling force applied to cable 12 produced an axial movement of outer sheath 13 and the metal conductors 14. The prior art gland used with cable gripped the sheath, but still allowed relative movement between the sheath and conductors, so that a pull on the cable was transmitted through the conductors to the electrical connections in the box, instead of stopping at the box.

Connector 10 includes a tubular connector body 16, having its opposite ends threaded on the outer surface to form at one end, called herein the back end, a box engaging nipple 19 of small external diameter and at its other end, called herein the forward end, a gland nut engaging nipple 24 having an external diameter preferably larger than that of nipple 19. Connector body 16 has an internal bore 17 extending axially therethrough between its front and back ends. Bore 17 includes a first section 18 of generally cylindrical diameter within nipple 19 and a second section 20 axially adjacent first section 18 and within nipple 24. Between bore sections 18 and 20 is an annular, forwardly facing beveled surface or seat 22 which acts as a stop, as discussed below.

Mounted on nipple 24 of connector body 16 is a nut 26 having a central opening for mounting over cable 12. Nut 26 has an internal thread 28 which mates with the thread of nipple 24 and is provided with the beveled wall 30 at the rear of threaded surface 28. Nut 26 may be made of steel, malleable iron, diecast alloy or a rigid plastic material.

Connector 10 also includes a two-piece bushing 32 made of a rigid plastic material, including a body or gland 34 of tubular form and a gland ring 36. As illustrated, body 34 and gland ring 36 are advantageously interconnected by a relatively thin tie-strip 38.

Body 34 has a base portion 42 and an axially extending sleeve portion 44 with an axial bore 40 extending therethrough. Base portion 42 has an external diameter to fit somewhat snugly within connector bore section 20 and faces bevelled surface 22.

When base portion 42 is telescopically seated in the second bore section 20 of connector body 16, sleeve 44 protrudes from connector body 16. Sleeve 44 terminates with an interiorly directed lip 46 having an inner diameter so as to slidably receive cable 12 therethrough. As illustrated, bore 40 is tapered inwardly towards bevelled surface 22.

The outer peripheral edge of base portion 42 adjacent the forward end of base portion 42 has an outwardly flared flange 50 which mates with the bevelled upper edge of connector body 16. While the length of base portion 43 is shown sufficient to abut bevelled surface 22 of connector body 16, the flared flange 50 provides a stop for seating body 34 within connector body 16, and provides a fluid-tight seal with connector body 16, as discussed below.

Gland ring 36 has a generally curved inner peripheral surface 48, which abuts the mating curved end of sleeve 44. The outer peripheral surface of gland ring 36 mates with the bevelled wall 30 of nut 26, as seen best in FIG. 2. The inner diameter and shape of the bore of gland ring 36 is substantially the same as the inner diameter and shape of lip 46.

To assemble connector 10 for operation, bushing body 34 is seated within second bore section 20 of connector body 16. Nut 26 remains threaded on nipple 24, but not tightened up until after cable 12 is inserted into bushing bore 40 and through the first bore section 18 of connector body 16. As nut 26 is tightened up, it travels along nipple 24 causing bevelled surface 30 to move gland ring 36 axially toward body 34 and exert a lateral force against sleeve 44 and driving lip 46 forward beyond the outer end of nut 26 and gland ring 36, and inward against the outer diameter of cable 12, and further urges flange 50 sealingly against the bevelled upper edge of connector body 16, as seen best in FIG. 3. Tightening of nut 26 to effect the clamping action forces lip 46 to flow between gland ring 36 and into the outer sheath 13 which produces a uniform pressure around lip 46 forcing it into the periphery of cable 12 against conductors 14 and transmits the pressure directly to conductors 14 carried by the cable. Thus, the clamping force of bushing 32 is effectively applied to the individual conductors of the cable as well as sheath 13 making a unitary clamp and effectively eliminating relative movement between the sheath and conductors 14, and between cable 12 and the outlet box, not shown. The movement of lip 46 of sleeve 44 between gland ring 46 and cable sheath 13 and beyond the outer edge of gland ring 36, as seen best in FIG. 3, provides for a positive gripping of cable or conduit and a controlled flow of plastic toward the surface of the cable or conduit. The positive grip of lip 46 with cable 12 is caused by its passing through and beyond sleeve 44, whereby gland ring 36 holds sleeve 44 firmly against sheath 13 and conductors 14 and transmits any pulling or bending force exerted on cable 12 through bushing 32 directly to connector body 16, and then to the box or unit to which connector 10 is mounted, thereby avoiding transmitting the force through conductors 14 to the electrical connection, which is relatively weak. Further, the clamping action of lip 46 on cable 12 displaces cable material, which bulges slightly on both sides of lip 46, as indicated at 47 in FIG. 3. Besides the frictional engagement of lip 46 with cable 12, bulges 47 resist longitudinal movement of the cable with respect to bushing 32.

Besides providing strain relief, lip 46 provides a fluid-tight seal about cable 12 or any conduit, and further flange 50 is forced against its mating surface on body 16 to form a fluid-tight seal with the body.

Connector 10 can be disassembled when needed. Bushing 32 will remain sealably engaging cable 12 even when connector 10 is disassembled.

Tie-strip 38 prevents separation of gland ring 36 and body 34 during fabrication, storage and assembly into connector body 16. The corresponding ring and body are always together as a unit so as to avoid any inadvertent mounting of the wrong gland ring size with the body, and reduces inventory problems.

Body 16 and nut 26 have exterior flats 52 and 54, respectively, for wrench grips. Other tool gripping means can be used.

A further embodiment is illustrated in FIG. 4, where a one-piece generally tubular connector body is made of a rigid plastic material. The outer peripheral surface body 56 is threaded at 58 and has a through bore. Sleeve 60 extends coaxially outwardly from body 56 and terminates with an interiorly directed lip 62. Nut 64 is threadedly mounted on body 56, and has an interiorly directed radial flange 66. Flange 66 has a flared inner edge 68 which mates with the rounded outer peripheral edge of sleeve 60. Nut 64 has interior threads 70 which mate with body threads 58.

In operation, cable 12 is received through the nut and body bores in the manner described above, and nut 64 is threaded on body 66, so that nut flange 66 forces lip 62 beyond the free edge of nut flange 66 into tight engagement with the cable outer wall displacing a portion of the cable sheath, in a manner discussed above.

While nut 64 is shown with flange 66, a nut similar to nut 26 can be used with a ring like ring 36. The use of a separate ring allows standard size nuts to be used with a variety of conduit sizes and to carry more than one conduit.

A further embodiment of the bushing is illustrated in FIG. 5 where the bushing 72 contains two separate bores for receiving two cables or cords. As shown in FIG. 5, bushing 72 has a body 74 and gland ring 76 interconnected with a tie-strap 80. Body 74 and gland ring 76 each contain aligned bores 78, which are illustrated as two. The operation and assembly of bushing 72 is similar to that described above.

Another embodiment, not shown, is where the opening in the bushing contains an elliptical or elongated cross-sectional bore for receiving elliptical or elongated cross-sectional cables or conduits. Even with these non-circular cables and conduits, standard fittings can be used. A good strain relief and sealed connection can be made with bushings having bores and glands of this elongated configuration.

Further, for thin wall conduits, such as small nylon tubes, which carry fluids, such as air or liquid, for pneumatic purposes, a thin wall metal insert or collar is inserted into the bore of the tube at the end received within the bushing. This metal insert provides sufficient support of the sleeve during compression of the bushing to provide the necessary strain relief and seal.

In the specification and claims the term "rigid plastic" refers to those plastic materials which have sufficient thickness and cohesiveness to require a substantial force to deform, and which only show an insubstantial distortion and deformation under the stress of normal usage. For example, a tough polyamide, which can be deformed in its cold state when the fastening means is tightened, such as nylon produced and sold under the trade name ZYTEL by E. I. DuPont de Nemours & Co. is advantageously used. The physical characteristics of this material are described in a publication entitled "DuPont ZYTEL Nylon Resins" published in 1962 by E. I. DuPont de Nemours & Co.. Other plastic materials having similar cold flow and elasticity characteristics after being deformed at room temperature or "cold," may be used in a similar manner. After compression beyond its elastic limit, this material does not return to its original form upon removal or cessation of the compressive pressure. Use is made of such rigid plastic material which endures cold deformation beyond its elastic limit, and remains resilient, and since this deformation is regulated and controlled, there is thereby produced a deformed plastic sealing device which is still elastic and which is particularly valuable for providing a resilient, yieldable and fluid-tight seal with the cable and connector and yet strong enough to transmit the pull of force exerted from the cable through the connector body to the outlet box or terminating member and not to the electrical connection.

Other plastics capable of being cold-molded and retaining elasticity may be used, such as for example, polychlorotrifluorethylene, DELRIN, sold by E. I. DuPont de Nemours & Co. and polypropylene.

In the present invention a high degree of strain relief is provided, as compared with prior art devices. For example, a 35-pound static load was applied to a cable using a connector of the present invention, and a connector using a gland made with NEOPRENE plastic material. The NEOPRENE gland failed after 100 seconds after the conductors moved more than 0.600 inches, whereas with the present invention the conductors moved only 0.027 inches. There was only a slight additional movement of the conductors with the present invention at the end of five minutes, which was the end of the test.

While only three conductors were shown in the drawing, any number of other conductors may be used. Also, additional conduits and cables can be used with a single fitting made in accordance with the present invention by varying the shape, size and number of the openings in the bushing. Also, electrical cables of varying cross-sectional shapes and configurations are difficult to seal, and which can easily be used with the present invention by modifying the shape of the opening of the lip 46. For example, elipses or lobed shapes are easily sealed with fittings disclosed herein. A multi-sided conduit, hexagonal, was sealingly clamped in a bushing with a round bore.

While the embodiments were illustrated as being used with flexible conduit and cable, they can also be used with rigid conduits and cables or metallic liquid-tight conduit.

Since the rigid plastic bushing is custom-fitted about the cable during assembly, it adapts to any imperfections on the surface of the cable in forming the seal, such as flat cuts.

While the surfaces of the fitting were illustrated as being threaded, other means of engagement can be used.

The term "cable" as used herein is intended to apply broadly to any electrical cable or cord which is generally filled with wire and insulation and covered by an outer sheath or covering, and the term "conduit" applies to any tube or channel which carries or conveys fluid or conductors.

Since many variations of the aforegoing described device can be readily devised without departing from the spirit of the present invention it is to be understood that this description is illustrative only and is not to be construed in a limiting sense, the present invention being defined solely by the appended claims.

What we claim is:

1. A fluid-tight strain relief fitting for connection with an end of a cable having a resilient outer sheath surrounding a plurality of conductors movable therein, comprising a generally tubular body having an internal bore extending into said body and passing therethrough, a bushing telescopically received within said bore and having a through bore for receiving said cable and including a base portion nesting within said body and a sleeve of reduced wall thickness extending beyond said body and terminating at its free end in an inwardly directed peripheral lip, said base portion having a substantially cylindrical portion and an outwardly extending flange at one end thereof adjacent said sleeve and axially spaced from the free end of said base portion, said flange matingly abutting a lip on said body circumferentially about their outer and inner surfaces respectively, a ring coaxially abutting said sleeve free end and at least one of the abutting faces of said sleeve and said ring being tapered, said bushing being made of a rigid plastic material, and means cooperating with said body for longitudinally urging said ring towards said base portion, thereby, circumferentially permanently contracting said sleeve and forcing the free end of said sleeve containing said lip to flow through and beyond said ring and into tight sealing contact with and depressing said resilient sheath and causing annular radial permanent contraction of a portion of said sleeve about said resilient sheath, said contraction displacing sheath material on both sides of said contracted sleeve portion to firmly anchor said fitting to said cable and firmly lock said conductors against movement within said cable and form a fluid tight seal with the cable sheath and body, at least a portion of said sleeve being sandwiched and embraced between said cable and said ring and a portion of the outer face of said sleeve coinciding with the inside face of said ring, when said ring is in its advanced position towards said bushing base portion, the radial dimensions of the sleeve and the base portion being selected so that the sleeve will deform inwardly about the base portion whereby said ring will engage the one end of the base portion and force said flange into sealing engagement with said lip.

2. A fitting as defined in claim 1, wherein said contracting means further includes a nut, and said ring having a generally bevelled portion coacting with the free end of said sleeve and being positioned between said nut and the fitting body, said ring inner diameter being spaced from said cable.

3. A fitting as in claim 2, wherein said ring and said nut having mating bevelled portions circumferentially about their outer and inner surfaces, respectively.

4. A fitting as defined in claim 2 wherein said bushing base portion has a larger outer diameter than said sleeve and has a tubular side wall contiguous to the surface of said inner wall of said body bore, said sleeve being permanently deformed in response to longitudinal movement of said ring and being driven inwardly into engagement with the cable.

5. A fitting as in claim 1 wherein said depression of said sheath by said sleeve being in the form of a channel.

6. A fitting as in claim 1 wherein said flange on said base portion is outwardly flared along an outer peripheral edge and mates with a bevelled upper edge of said body, wherein said longitudinal movement of said ring towards said base portion urges said flared flange of said base portion against the bevelled edge of said body to form a fluid tight seal.

* * * * *